United States Patent [19]

Morioka et al.

[11] Patent Number: 4,618,536
[45] Date of Patent: Oct. 21, 1986

[54] MAGNETIC RECORDING MEDIUM

[75] Inventors: Akira Morioka; Takeshi Matsuura, both of Kyoto; Yoshiyuki Takahira, Suita, all of Japan

[73] Assignee: Hitachi Maxell, Ltd., Osaka, Japan

[21] Appl. No.: 647,244

[22] Filed: Sep. 4, 1984

[30] Foreign Application Priority Data

Sep. 7, 1983 [JP] Japan .................................. 58-165779

[51] Int. Cl.$^4$ ................................................ G11B 5/70
[52] U.S. Cl. .................................... 428/329; 360/134; 360/135; 360/136; 427/128; 428/323; 428/694; 428/900; 428/328
[58] Field of Search ............... 428/695, 694, 900, 328, 428/329, 403, 405, 407; 427/131, 132; 252/62.54; 360/134–136

[56] References Cited

U.S. PATENT DOCUMENTS

| 4,275,115 | 6/1981 | Naruse | 428/329 |
| 4,315,052 | 2/1982 | Takahashi | 428/695 |
| 4,399,189 | 8/1983 | Nakashima | 428/695 |
| 4,420,408 | 12/1983 | Kajimoto | 252/62.54 |
| 4,425,400 | 1/1984 | Yamaguchi | 428/695 |
| 4,474,848 | 10/1984 | Yamaguchi | 428/695 |
| 4,571,362 | 2/1986 | Sato | 428/900 |

Primary Examiner—Ellis P. Robinson
Attorney, Agent, or Firm—Birch, Stewart, Kolasch & Birch

[57] ABSTRACT

A magnetic recording medium having a high durability with good electro-magnetic properties, which comprises a base material and a magnetic layer provided thereon, the magnetic layer containing magnetic particles and a binder, characterized in that the magnetic layer further comprises alpha-$Fe_2O_3$ particles, $Al_2O_3$ particles and $Cr_2O_3$ particles.

1 Claim, No Drawings

MAGNETIC RECORDING MEDIUM

BACKGROUND OF THE INVENTION

The present invention relates to a magnetic recording medium. More particularly, it relates to a magnetic recording medium having high durability and good electro-magnetic properties such as SN ratio.

In general, the magnetic recording medium comprises a base material and a magnetic layer provided thereon, the magnetic layer containing magnetic particles and a binder. The magnetic recording medium, particularly the magnetic layer, is required to be highly resistant to abrasion and excellent in durability since it runs slidingly in close contact with a magnetic head during recording and reproducing.

In order to satisfy these requirements, it has been proposed to improve the abrasion resistance of a magnetic layer by incorporating therein any solid additive such as alpha-$Fe_2O_3$ particles, $Al_2O_3$ particles or $Cr_2O_3$ particles. However, this can not produce a sufficient improvement. It has been also proposed to incorporate a mixture of alpha-$Fe_2O_3$ particles having a relatively large particle size and $Cr_2O_3$ particles having a relatively high hardness into a magnetic layer. However, this can not assure sufficient abrasion resistance when running at a low speed.

SUMMARY OF THE INVENTION

As a result of extensive study, it has been found that the incorporation of alpha-$Fe_2O_3$ particles, $Al_2O_3$ particles and $Cr_2O_3$ particles into a magnetic layer can improve significantly the abrasion resistance without deterioration of the electro-magnetic properties. This finding is quite of an unexpected nature, because as observed in the case of using alpha-$Fe_2O_3$ particles and $Cr_2O_3$ particles in combination, the combined use of alpha-$Fe_2O_3$ particles and $Al_2O_3$ particles or of $Al_2O_3$ particles and $Cr_2O_3$ particles can not afford sufficient abrasion resistance or can not sufficiently prevent the production of abrasion or damage on a magnetic head.

DETAILED DESCRIPTION

According to the present invention, there is provided a magnetic recording medium having high durability and good electro-magnetic properties, which comprises a base material and a magnetic layer provided thereon, the magnetic layer containing magnetic particles and a binder, characterized in that the magnetic layer comprises further alpha-$Fe_2O_3$ particles, $Al_2O_3$ particles and $Cr_2O_3$ particles in combination.

The alpha-$Fe_2O_3$ particles to be used in this invention are preferred to have an average particle size of 0.4 to 2.0 microns. When the particle size is too small, the improvement of abrasion resistance is not sufficient. When it is too large, the smoothness at the surface of the magnetic layer is lost so that the electro-magnetic properties deteriorate. Usually, the alpha-$Fe_2O_3$ particles are employed in an amount of 2 to 10% by weight to the magnetic particles in the magnetic layer. In the case of when the amount is less than the lower limit, the abrasion resistance is not sufficiently improved. In case of the amount being more than said upper limit, the relative proportion of the magnetic particles in the magnetic layer is decreased and also the smoothness at the surface of the magnetic layer is lost. The electro-magnetic properties thus deteriorate.

The $Al_2O_3$ particles have usually an average particle size of 0.2 to 0.7 micron. Since the $Al_2O_3$ particles have a high hardness, their smaller particle size is favorable for improvement of the abrasion resistance. When, however, the particle size is smaller than the lower limit, the improvement of abrasion resistance is insufficient. When the particle size is larger than the upper limit, the magnetic head may be abraded. The amount of the $Al_2O_3$ particles may be usually from 2 to 4% by weight to the magnetic particles. The use in a smaller proportion does not produce sufficient improvement in abrasion resistance. The use in a larger proportion causes abrasion of the magnetic head and deteriorates the smoothness at the surface of the magnetic layer deteriorates. The electro-magnetic properties are thus lowered.

The $Cr_2O_3$ particles are favored to have a high hardness and an average particle size of 0.4 to 1.5 microns. When the particle size is smaller than the lower limit, the abrasion resistance is not sufficiently improved. When the particle size is larger than the upper limit, the smoothness at the surface deteriorates so that an unfavorable influence is afforded the electro-magnetic properties. The $Cr_2O_3$ particles may be used in an amount of 0.2 to 1.0% by weight based on the weight of the magnetic particles. The use in a smaller proportion does not produce a sufficient improvement of the abrasion resistance. The use in a larger proportion causes abrasion of the magnetic head and deterioration of the electro-magnetic properties.

Preparation of the magnetic recording medium of this invention may be carried out by a per se conventional procedure. For instance, a magnetic coating composition is first prepared by mixing magnetic particles (e.g. gamma-$Fe_2O_3$ particles or intermediary oxides thereto, $Fe_3O_4$ particles or intermediary oxides thereto, Co-containing gamma-$Fe_2O_3$ particles or intermediary oxides thereto, Co-containing $Fe_3O_4$ particles or intermediary oxides thereto, $CrO_2$ particles, Fe particles, Co particles, Fe-Ni particles, Fe-Co-Ni particles, barium-ferrite particles), the three kinds of particles (i.e. alpha-$Fe_2O_3$ particles, $Al_2O_3$ particles and $Cr_2O_3$ particles), a binder (e.g. vinyl chloride/vinyl acetate copolymer, cellulose resin, polyurethane resin, polyester resin, acrylic resin, rubbery resin, isocyanate compound) and an organic solvent (e.g. cyclohexanone, toluene, methylisobutylketone, methylethylketone) with or without any other additive such as a lubricant (e.g. fatty acids, fatty acid esters, silicone lubricants, fluorine-containing lubricants), a dispersing agent and a polishing agent to make a uniform dispersion. The resultant magnetic coating composition is then applied onto a base material (e.g. polyester film) by the aid of a roll coater, followed by drying to form a magnetic layer.

The thus prepared magnetic recording medium having a magnetic layer comprising alpha-$Fe_2O_3$ particles, $Al_2O_3$ particles and $Cr_2O_3$ particles shows high abrasion resistance with good electro-magnetic properties. Its magnetic layer is hardly damaged, and a magnetic head is hardly abraded therewith.

PREFERRED EMBODIMENTS

Practical and presently preferred embodiments of the invention are illustratively shown in the following Examples wherein part(s) and % are by weight.

EXAMPLES 1 TO 6

| Materials | Part(s) |
| --- | --- |
| Co-containing gamma-$Fe_2O_3$ particles | 100 |
| Nitrocellulose | 9.1 |
| Carbon black | 4.5 |
| Zinc stearate | 0.5 |
| Cyclohexanone | 110 |
| Toluene | 110 |

To a mixture of the above materials, alpha-$Fe_2O_3$ particles, $Al_2O_3$ particles and $Cr_2O_3$ particles were added in the amounts as shown in Table 1, and the resultant mixture was stirred in a ball mill for 48 hours. A polyurethane resin (40.5 parts; solid components, 8.1 parts) was added thereto, and stirring was continued for 2 hours. Then, the following materials were added thereto, followed by stirring for 1 hour:

| Materials | Part(s) |
| --- | --- |
| "Colonate L" (trifunctional lower molecular weight isocyanate compound (manufactured by Nippon Polyurethane) | 4 |
| n-Butyl stearate | 1 |
| Myristic acid | 2 |
| Cyclohexanone | 12 |
| Toluene | 12 |

The resulting mixture was passed through a filter to make a magnetic coating composition.

The magnetic coating composition as above obtained was applied onto the surface of a polyester film of 14 microns in thickness as the base, followed by drying to make a magnetic layer of about 5 microns in thickness. After calendering treatment, the resultant film was cut in a pre-determined width to give a video tape.

EXAMPLE 7

In the same manner as in Example 1 but with the following modifications, there was prepared a video tape:
(a) Co-containing gamma-$Fe_2O_3$ particles were replaced by the same amount of strongly magnetic metallic iron particles;
(b) Nitrocellulose was replaced by "VAGH" (vinyl chloride/vinyl acetate/vinyl alcohol copolymer; manufactured by Union Carbide Corp.) (10.5 parts);
(c) The amount of polyurethane resin was decreased from 40.5 parts to 37 parts (solid components, 7.4 parts);
(d) The amount of "Colonate L" was decreased from 4 to 3.2 parts.

COMPARATIVE EXAMPLES 1 TO 6

In the same manner as in Example 1 but with modification of the amounts of alpha-$Fe_2O_3$ particles, $Al_2O_3$ particles and $Cr_2O_3$ particles as shown in Table 1, there was prepared a video tape.

COMPARATIVE EXAMPLE 7

In the same manner as in Example 7 but omitting the use of $Cr_2O_3$ particles, there was prepared a video tape.

TABLE 1

| | Average particle size ($\mu$) | Amount (part(s)) | | | | | | | | | | | |
| --- | --- | --- | --- | --- | --- | --- | --- | --- | --- | --- | --- | --- | --- |
| | | Example | | | | | | Comparative Example | | | | | |
| | | 1 | 2 | 3 | 4 | 5 | 6 | 1 | 2 | 3 | 4 | 5 | 6 |
| $\alpha$-$Fe_2O_3$ particle | 0.5 | — | 10.0 | — | — | — | — | — | — | — | — | — | — |
| | 1.0 | 5.0 | — | — | 3.5 | 7.0 | 2.0 | 7.0 | — | — | 5.0 | 5.0 | — |
| | 2.0 | — | — | 4.5 | — | — | — | — | — | — | — | — | — |
| $Al_2O_3$ particle | 0.4 | 2.0 | 2.0 | 3.0 | — | 4.0 | 4.0 | — | 6.0 | — | 4.0 | — | 4.0 |
| | 0.7 | — | — | — | 4.0 | — | — | — | — | — | — | — | — |
| $Cr_2O_3$ particle | 0.5 | — | — | — | — | 1.0 | — | — | — | — | — | — | — |
| | 1.0 | 0.8 | 0.4 | 1.0 | 0.5 | — | — | — | — | 1.5 | — | 1.0 | 1.0 |
| | 1.5 | — | — | — | — | — | 1.0 | — | — | — | — | — | — |

With respect to each of the video tapes as prepared in Examples 1 to 7 and Comparative Examples 1 to 7, roughness at the surface of the magnetic layer, color SN ratio, still characteristics, slow motion reproduction, head abrasion and head clogging were tested by the following procedures:

Roughness at the surface of the magnetic layer:

The roughness (Ra) at the center line of the video tape was measured by the use of a feeler type surface roughness tester.

Color SN ratio:

Using a video tape recorder of VHS mode, the monochromatic signals of a color video noise measurement apparatus were recorded and reproduced. Based on the AM noise as measured, the color SN ratio was calculated and indicated by the relative value to the standard tape.

Still characteristics:

Using a video tape recorder of VHS mode, the video tape was reproduced for 2 hours in still mode. Then, the extent of damage at the magnetic layer in contact with the video head was observed, and evaluation was made on the following criteria: O—no damage; $\Delta$—slightly damaged; X—seriously damaged.

Slow motion reproduction:

Using a video tape recorder of VHS mode, the video tape was run ten rounds at a speed of 1/10 of the conventional running speed for reproduction. Then, the extent of damage at the magnetic layer was observed, and evaluation was made on the same criteria as above.

Head abrasion and head clogging:

Using a video tape recorder of VHS mode, the video tape was run one hundred rounds under the circumstance of 40° C. and 80% RH. Then, the abrasion amount of the video head was measured, and the change of the output during the running was recorded. The head clogging was evaluated on the depression of the output according to the following criteria: O—no depression; $\Delta$—slight depression; X—remarkable depression.

The results are shown in Table 2.

TABLE 2

| | Roughness at surface of magnetic layer ($\mu$) | Color SN ratio (dB) | Still characteristics | Slow motion reproduction | Head abrasion ($\mu$) | Head clogging |
|---|---|---|---|---|---|---|
| Example | | | | | | |
| 1 | 0.04 | +4.5 | O | O | 0.2 | O |
| 2 | 0.05 | +4.3 | O | O | 0.3 | O |
| 3 | 0.05 | +4.4 | O | O | 0.3 | O |
| 4 | 0.04 | +4.5 | O | O | 0.3 | O |
| 5 | 0.04 | +4.4 | O | O | 0.4 | O |
| 6 | 0.04 | +4.5 | O | O | 0.5 | O |
| 7 | 0.03 | — | | | 0.1 | |
| Comparative Example | | | | | | |
| 1 | 0.04 | +4.4 | X | Δ | 0.2 | Δ |
| 2 | 0.05 | +4.3 | Δ | Δ | 0.2 | Δ |
| 3 | 0.05 | +4.2 | Δ | X | 0.8 | Δ |
| 4 | 0.04 | +4.3 | Δ | Δ | 0.3 | Δ |
| 5 | 0.05 | +4.2 | Δ | Δ | 0.7 | Δ |
| 6 | 0.05 | +4.2 | X | Δ | 0.8 | Δ |
| 7 | 0.03 | — | X | X | 0.1 | X |

From Table 2, it is understood that the video tapes in Examples 1 to 7 are much less than those in Comparative Examples 1 to 7 in the extent of damage on the magnetic layer, the extent of abrasion and the clogging at the videohead. Further, the former have a better smoothness at the surface and a higher SN ratio than the latter do. Thus, the magnetic recording meium of the invention is high in durability and good in electro-magnetic properties.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An abrasion resistant magnetic recording medium comprising a base material and a magnetic layer provided thereon, said magnetic layer containing magnetic particles, a binder, and a mixture of abrasion resistant particles consisting essentially of alpha-$Fe_2O_3$ particles having an average particle size of from 0.4 to 2.0 microns in an amount of from 2 to 10% by weight to the weight of the magnetic particles, $Al_2O_3$ particles having an average particle size of from 0.2 to 0.7 micron in an amount of from 2 to 4% by weight to the weight of the magnetic particles and $Cr_2O_3$ particles having an average particle size of from 0.4 to 1.5 microns in an amount of from 0.2 to 1.0% by weight to the weight of the magnetic particles.

* * * * *